(12) United States Patent
Wang

(10) Patent No.: US 12,729,760 B2
(45) Date of Patent: Sep. 8, 2026

(54) TRANSMISSION DEVICE FOR DENTATE STRUCTURE

(71) Applicant: FIVEGRAND INTERNATIONAL CO., LTD., New Taipei City (TW)

(72) Inventor: Ting-Jui Wang, New Taipei City (TW)

(73) Assignee: FIVEGRAND INTERNATIONAL CO., LTD., New Taipei City (TW)

( * ) Notice: Subject to any disclaimer, the term of this patent is extended or adjusted under 35 U.S.C. 154(b) by 22 days.

(21) Appl. No.: 18/395,647

(22) Filed: Dec. 25, 2023

(65) Prior Publication Data

US 2024/0240702 A1 Jul. 18, 2024

(30) Foreign Application Priority Data

Jan. 13, 2023 (TW) ................................ 112101651

(51) Int. Cl.
*F16H 37/12* (2006.01)
*F16H 21/18* (2006.01)

(52) U.S. Cl.
CPC ........... *F16H 37/124* (2013.01); *F16H 21/18* (2013.01); *F16H 2704/00* (2013.01)

(58) Field of Classification Search
CPC .... F16H 37/124; F16H 21/18; F16H 2704/00; F16H 19/04
See application file for complete search history.

(56) References Cited

U.S. PATENT DOCUMENTS

2018/0087544 A1* 3/2018 Magaribuchi ........... F16H 19/04
2024/0240703 A1* 7/2024 Wang ...................... F16H 55/17
2026/0055805 A1* 2/2026 Wang .................... F16H 37/124

FOREIGN PATENT DOCUMENTS

CN 114754117 A 7/2022
TW M476194 U 4/2014

* cited by examiner

*Primary Examiner* — Terence Boes

(57) ABSTRACT

A transmission device for a dentate structure includes a corpus portion and an operating member. The corpus portion is adapted to be disposed at a body. The operating member is movably fitted to the corpus portion. The operating member has a dentate portion for actuating the dentate structure while operating in conjunction with the operating member, allowing the body to enable dentate structure transmission. Alternatively, the dentate portion actuates the dentate portion of another operating member while operating in conjunction with the operating member, allowing transmission to occur between the two operating members.

3 Claims, 13 Drawing Sheets

TRANSMISSION DEVICE FOR DENTATE STRUCTURE

CROSS-REFERENCE TO RELATED APPLICATION

This non-provisional application claims priority under 35 U.S.C. § 119(a) on Patent Application No(s). 112101651 filed in Taiwan, R.O.C. on Jan. 13, 2023, the entire contents of which are hereby incorporated by reference.

BACKGROUND OF THE INVENTION

1. Field of the Invention

The present disclosure relates to a transmission structure, and in particular to a transmission device for a dentate structure.

2. Description of the Related Art

A gear serving as a transmission component is disposed on every related object to allow transmission to take place between the objects and thereby enable the displacement thereof. The gears mesh with each other to enable one object to drive the motion or rotation of the other object.

However, the transmission structure of conventional gears has drawbacks. The conventional transmission structure is rarely embodied in parts and components suitable for modularization to the detriment of the flexible applicability of the transmission function of the gears on the objects. Furthermore, the conventional transmission structure precludes the possibility of the use of axles and gears made of different materials to achieve transmission purposes, leaving little room for improvement in terms of structural reinforcement and cost reduction.

In view of the aforesaid drawbacks of the prior art, it is important to provide improved technology of a dentate structure transmission structure.

BRIEF SUMMARY OF THE INVENTION

To this end, the inventor of the present invention performed related research and devised a transmission device for a dentate structure to enable the dentate structure to be flexibly applied to a body for transmission purposes.

The disclosure provides a transmission device for a dentate structure, comprising: a corpus portion adapted to be disposed at a body; and an operating member movably fitted to the corpus portion and having a dentate portion and operating to allow the dentate portion to actuate a dentate structure, or the operating member operating to allow the dentate portion to actuate a dentate portion of another operating member or another body.

In an embodiment, the corpus portion has a fitting portion with a material-storing space, and the fitting portion is adapted to be disposed at a securing portion of the body and press against the corpus portion or the body such that material of the body flows into or enters the material-storing space, allowing the fitting portion to be fixed in place.

In an embodiment, the corpus portion has a fitting portion which is an expanded connection structure and is adapted to be disposed at a securing portion of the body, and the fitting portion or the body is pressed to allow the corpus portion to be fixed to the body by the fitting portion through expanded connection.

In an embodiment, the corpus portion has a fitting portion, and the fitting portion is a solderable member. The fitting portion is adapted to be disposed at the securing portion of the body to allow solder thereon to be heated up for soldering the fitting portion to the body.

In an embodiment, the corpus portion has a fitting portion adapted to be disposed at the securing portion of the body and comprises a fastening member, with the fastening member fastened to the fitting portion and thus fixedly coupled to the body, or the fitting portion comprises an engaging member engaged with the fitting portion and thus fixedly coupled to the body, or the fitting portion comprises a resilient engaging member engaged with the fitting portion and thus fixedly coupled to the body.

In an embodiment, the operating member has an abutting portion, a head portion, or a resilient component, the abutting portion being adapted to abut against the corpus portion, the head portion being adapted to abut against the corpus portion, the resilient component having an end abutting against the corpus portion and another end abutting against the operating member, or the resilient component having an end abutting against the corpus portion from inside and another end abutting against the abutting portion, or allowing the operating member to be normally pushed in a direction toward the dentate portion, or the resilient component having an end abutting against the corpus portion and another end abutting against the head portion, or allowing the operating member to be normally pushed in a direction away from the dentate portion.

In an embodiment, the dentate portion moves in a pushing direction to come into contact with the dentate structure and thus enable linked motion, and the linked motion is movement, rotation, relative motion, labor-saving motion, gear motion, rack motion, or linear motion.

In an embodiment, the dentate portion moves in a pulling direction to come into contact with the dentate structure and thus enable linked motion, and the linked motion is movement, rotation, relative motion, labor-saving motion, gear motion, rack motion, or linear motion.

In an embodiment, the operating member is bolted to a head portion being movable, relative to the corpus portion, to an abutting high-position or an abutting low-position to abut against the corpus portion, or adapted to attain positioning upon completion of the movement of the operating member.

In an embodiment, the operating member is bolted to a head portion being movable, relative to the corpus portion, to an abutting high-position or an abutting low-position to abut against the corpus portion, or adapted to resist a resilience force of the resilient component and thus attain positioning upon completion of the movement of the operating member.

In an embodiment, the corpus portion or the operating member has a limiting portion conducive to rotation prevention, positioning or orienting between the operating member and the corpus portion, and/or the corpus portion has a rotation-preventing portion conducive to rotation prevention and position limitation relative to the body, or the rotation-preventing portion is adapted to limit a binding position or direction of the corpus portion relative to the body, or the rotation-preventing portion is adapted to limit a motion direction of the dentate structure.

In an embodiment, the corpus portion and the body are fitted together, or the corpus portion is integrally formed with the body, with the body being a metallic piece, plastic piece, housing, casing, substrate, motherboard, cabinet, rail, cover, handle, fastener or heat-dissipating body.

In an embodiment, the corpus portion is a seat portion, and the dentate structure is coupled to the seat portion or rotatably coupled to the seat portion, or the seat portion has a coupling portion adapted to be fitted to an object, and/or an intervening member conducive to friction reduction is disposed between the seat portion and the dentate structure, and/or the object has a rotation-preventing portion conducive to rotation prevention and position limitation between the object and the seat portion, or the rotation-preventing portion is adapted to limit a binding position or direction of the seat portion relative to the object, or the rotation-preventing portion is adapted to limit the motion direction of the dentate structure, and/or the seat portion has an axle portion and a control portion, with the dentate structure restrained by the control portion and thus movably coupled to the axle portion, or the seat portion has the axle portion fixedly coupled to the dentate structure, and/or the axle portion has a stopping portion disposed outside the dentate structure, and/or the seat portion has a bottom portion movably coupled to the axle portion and confined to between the dentate structure and the stopping portion, or the seat portion has a bolt portion, and/or the bolt portion is adapted to be movably coupled to the dentate structure such that the axle portion and the control portion are coupled to each other or integrally formed, or the axle portion and the stopping portion are coupled to each other or integrally formed, or the coupling portion and the seat portion are coupled to each other or integrally formed.

In an embodiment, the dentate structure comprises a manipulating portion extended to a side of the dentate structure and actuated to cause actuation of the dentate structure, or the dentate portion is motion-linked to the dentate structure to allow the operating member to move relative to the corpus portion, or the operating member is operated such that actuation of the dentate portion causes linked-motion of the dentate structure, or actuation of the dentate structure causes actuation of the manipulating portion.

In an embodiment, the rotation-preventing portion is D-shaped, polygonal, dentate, convex or concave.

In an embodiment, the dentate structures are provided in the number of two, with one dentate structure undergoing motion relative to or being in contact with the other dentate structure, or with the two dentate structures undergoing motion relative to or being in contact with the other two dentate structures.

In an embodiment, the dentate portion or dentate structure or teeth is a rack, gear or threaded body.

In an embodiment, the dentate structure is pivotally connected to the object through the seat portion, or the dentate portion is configured as teeth in contact with a second body, or the dentate structure is in contact with the dentate portion or is configured as a circuit connected between the dentate structure, the operating member and/or the second body, or the circuit is in communication connection with an electronic apparatus via wireless or wired signals, or the operating member is moved to allow the dentate structure, the operating member or the second body to transmit motion to control the electronic apparatus, or the electronic apparatus controllably causes the dentate structure to rotate or controllably causes the operating member to move or is adapted to drive the second body undergoing movement, relative motion, or motion.

In an embodiment, the object has a fixing element comprising a head portion and a neck portion, with the operating member movably disposed at the neck portion and restrained by the head portion.

In an embodiment, the operating member is movably disposed at the object or is adapted to be a circuit connected between the dentate structure and the operating member, or the circuit is in communication connection with an electronic apparatus via wireless or wired signals, or the rotation of the dentate structure is adapted to control the electronic apparatus, or the electronic apparatus is adapted to control the dentate structure or controllably cause the operating member to undergo movement, relative motion, or motion.

In an embodiment, the dentate structures are provided in the number of two, with one dentate structure being a threaded body and being in contact with the other dentate structure, allowing the two dentate structures to undergo movement, relative motion, or motion.

In an embodiment, the dentate portion has a post moving because the dentate portion and the other dentate structure are moving, or the post undergoes motion and thus drives the dentate portion and the other dentate structure undergoing motion.

In an embodiment, at least two dentate structures are connected by a connection component and adapted to be driven, moved, jointly moved or motion-linked, and/or the dentate structures each have an engaging portion adapted to be driven, moved, jointly moved or motion-linked, and/or the dentate structures each have a manipulating portion for controllably operating or moving the engaging portion.

In an embodiment, the connection component is a link, track, strip-shaped piece, belt, metallic band, non-metallic band, dentate body, or chain.

In an embodiment, the dentate structure has an engaging portion for use in fastening or for being fastened to another body.

In an embodiment, the engaging portion is a threaded body, outer fastener, inner fastener, resilient fastener, or post.

Therefore, according to the disclosure, a transmission device for a dentate structure enables an operating member to be movably coupled to a corpus portion and allows a fitting portion of the corpus portion to be fitted to a body and thereby effectuates transmission of the dentate structure, achieving flexible application of the transmission of the dentate structure on the body.

DETAILED DESCRIPTION OF THE INVENTION

Figure 1:
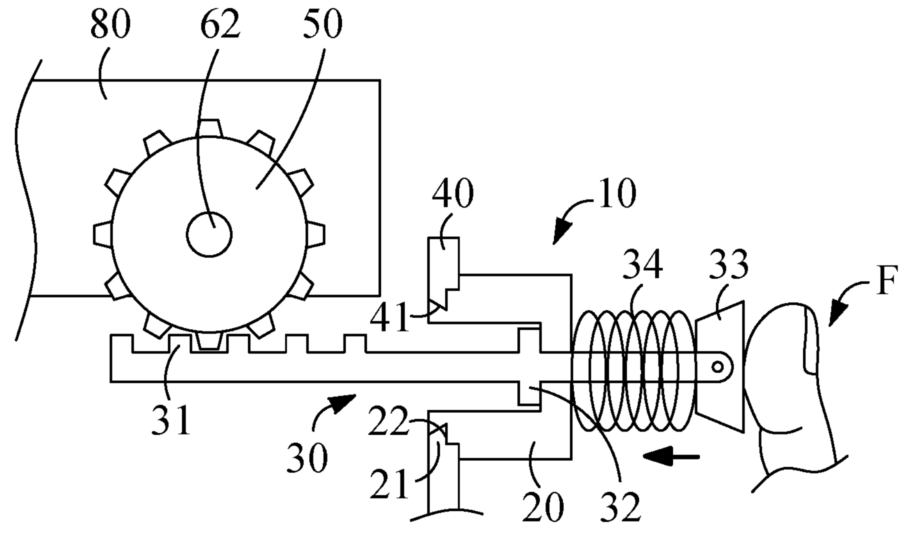
FIG. 1 is a schematic view of a transmission device according to the first embodiment of the disclosure.

To facilitate understanding of the object, characteristics and effects of this present disclosure, embodiments together with the attached drawings for the detailed description of the present disclosure are provided.

Referring to FIG. 1 through FIG. 25, the disclosure provides a transmission device 10 for a dentate structure, comprising a corpus portion 20 and an operating member 30. The corpus portion 20 is adapted to be disposed at a body 40. The operating member 30 is movably fitted to the corpus portion 20. The operating member 30 has a dentate portion 31. The operating member 30 in operation enables the dentate portion 31 to actuate a dentate structure, for example, a gear 50. Alternatively, given two operating members 30, the dentate portion 31 of one of the operating members 30 actuates, because of the operation of the operating member 30, the dentate portion 31 (not shown in the diagram) of the other operating member 30, allowing the operating member 30 to cause the operation of the other operating member 30. The body 40 is a metallic piece, plastic piece, printed circuit board, housing, casing, cabinet, rail, cover, handle, fastener or heat-dissipating body.

Figure 3:
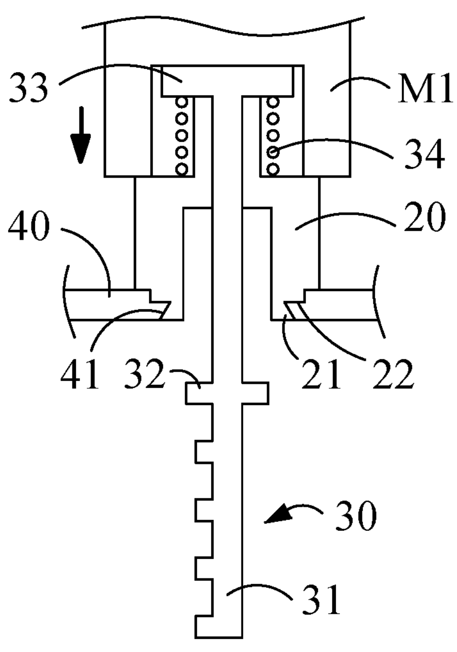
FIG. 3 is a schematic view of the transmission device with a corpus portion fitted to a body according to the first embodiment of the disclosure.

As shown in FIG. 1, in the first embodiment, the operating member 30 has an abutting portion 32 and a head portion 33. The abutting portion 32 and the head portion 33 abut against the corpus portion 20 while the operating member 30 is moving. Alternatively, the operating member 30 has only one abutting portion 32 for abutting against the corpus portion 20 while the operating member 30 is moving. Alternatively, the operating member 30 has only one head portion 33 for abutting against the corpus portion 20 while the operating member 30 is moving. The corpus portion 20 has a fitting portion 21 adapted to be fitted to the body 40. The fitting portion 21 has a material-storing space 22. The fitting portion 21 can be placed at a securing portion 41 of the body 40, and the corpus portion 20 abuts against the body 40; then, for example, a mold M1 abuts against the head portion 33 and thereby presses the corpus portion 20 against the body 40 (as shown in FIG. 3) such that the material of the body 40 undergoes deformation at a point corresponding in position to the material-storing space 22 and then flows into or enters the material-storing space 22, allowing the fitting portion 21 of the corpus portion 20 to be fixed to the body 40. The body 40 and the corpus portion 20 are two separate elements and thus fitted to each other. Alternatively, the corpus portion 20 is integrally formed with the body 40.

Figure 2A:
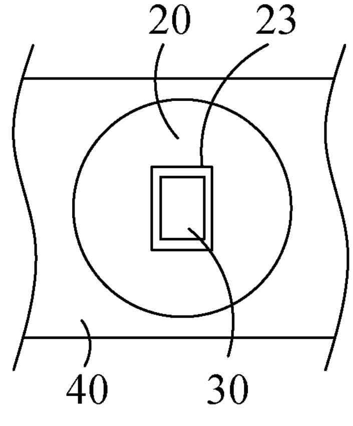
FIG. 2A is a schematic view of a limiting portion and a rotation-preventing portion according to any one of the embodiments of the disclosure.
Figure 2B:
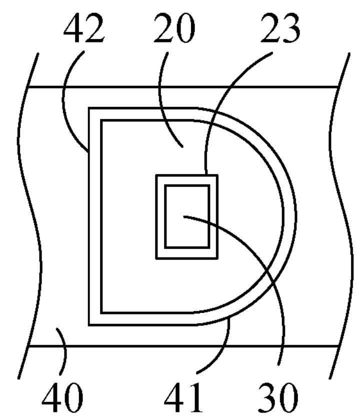
FIG. 2B is a schematic view of another limiting portion and another rotation-preventing portion according to any one of the embodiments of the disclosure.

In the first embodiment, the operating member 30 and the head portion 33 are two separate elements bolted to each other and thus coupled together, but the disclosure is not limited thereto; for example, in this embodiment, the operating member 30 and the head portion 33 are integrally formed. The corpus portion 20 has a limiting portion 23 conducive to rotation prevention, positioning or orienting between the operating member 30 and the corpus portion 20. In the first embodiment, the limiting portion 23 is quadrilateral in shape (as shown in FIG. 2A) but can also be D-shaped, dentate, concave or convex.

Figure 4:
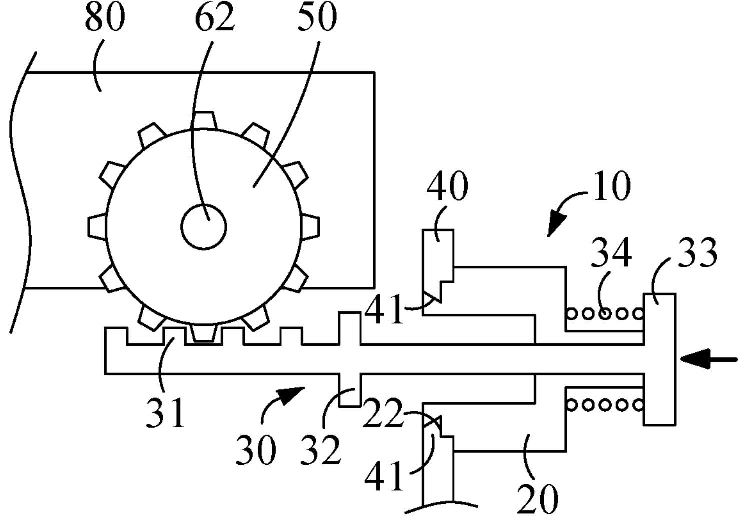
FIG. 4 is a schematic view of the transmission device operating in a pushing direction according to the first embodiment of the disclosure.
Figure 5:
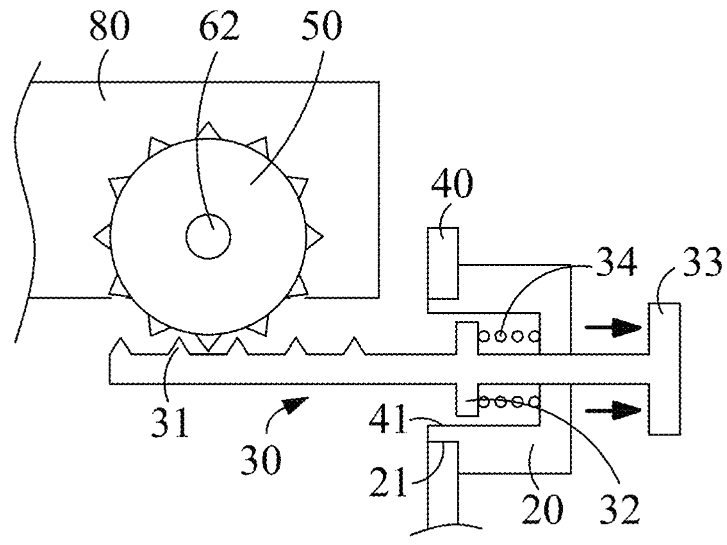
FIG. 5 is a schematic view of the transmission device operating in a pulling direction according to the first embodiment of the disclosure.

In the first embodiment, the operating member 30 comprises a resilient component 34 with one end abutting against the corpus portion 20 from outside and the other end abutting against the head portion 33 to allow the operating member 30 to be normally pushed in a direction away from the dentate portion 31; meanwhile, a finger F presses on the head portion 33 to drive the displacement of the operating member 30 such that the dentate portion 31 drives the rotation of the gear 50. The dentate portion 31 moves in a pushing direction to come into contact with the gear 50 and thus enable linked motion (as shown in FIG. 4). Alternatively, the dentate portion 31 moves in a pulling direction to come into contact with the gear 50 and thus enable linked motion (as shown in FIG. 5). In this embodiment, the linked motion is rotation, but the disclosure is not limited thereto; for example, the linked motion is motion, such as relative motion, labor-saving motion, gear motion, rack motion, or linear motion.

Figure 6:
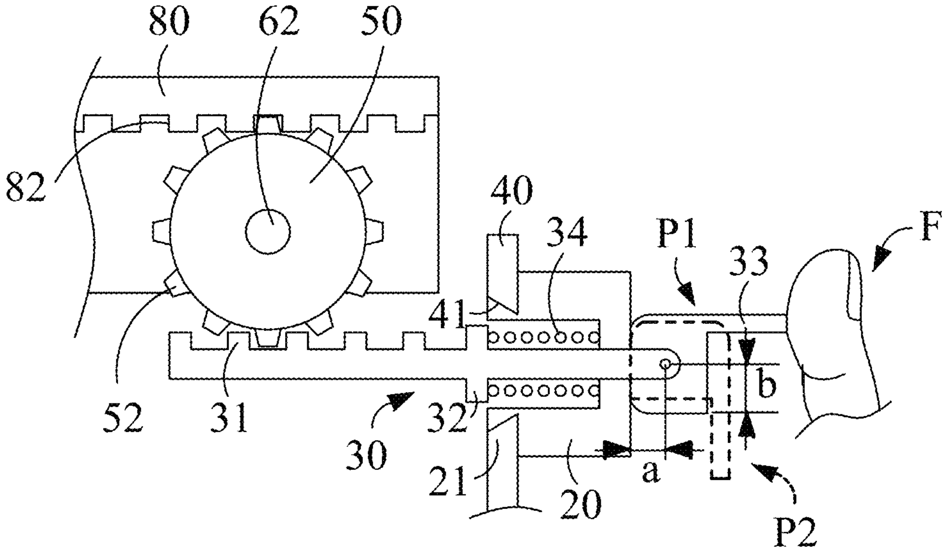
FIG. 6 is a schematic view of the transmission device according to the second embodiment of the disclosure.
Figure 7:
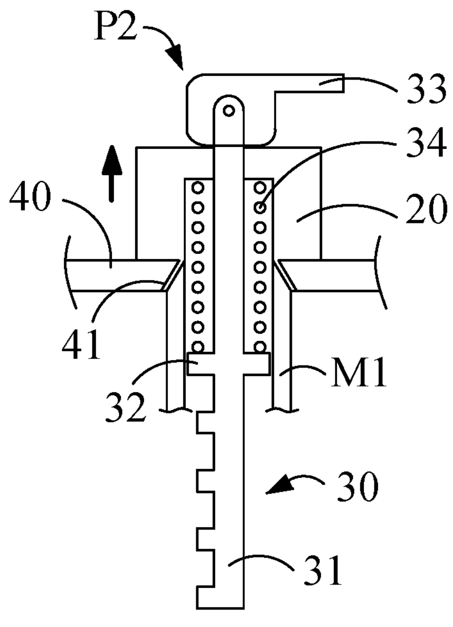
FIG. 7 is another schematic view of the transmission device according to the second embodiment of the disclosure.

As shown in FIG. 6, in the second embodiment of the disclosure, two separate elements bolted to each other and thus coupled together are disposed between the operating member 30 and the head portion 33. Unlike the first embodiment, the second embodiment has distinguishing technical features as described below. In the second embodiment, a first distance a and a second distance b are defined between the bolting point of the head portion 33 and the body 40. The head portion 33 is, relative to the corpus portion 20, movable to an abutting high-position P1 to abut against the corpus portion 20 (as shown in FIG. 6) or to an abutting low-position P2 to abut against the corpus portion 20 (as shown in FIG. 7), attaining positioning upon completion of the movement of the operating member 30.

In the second embodiment, the operating member 30 comprises a resilient component 34 with one end abutting against the corpus portion 20 from inside and the other end abutting against the abutting portion 32 to allow the operating member 30 to be normally pushed in a direction toward the dentate portion 31. After moving to the abutting high-position P1 or the abutting low-position P2, the operating member 30 has to resist the resilience force of the resilient component 34, attaining positioning upon completion of the movement of the operating member 30.

In the second embodiment, the fitting portion 21 is an expanded connection structure, and the body 40 has a securing portion 41. The fitting portion 21 is disposed at the securing portion 41. The fitting portion 21 is pressed against the body 40 to allow the operating member 30 to be fixed to the body 40 by the fitting portion 21 through expanded connection.

Figure 8:
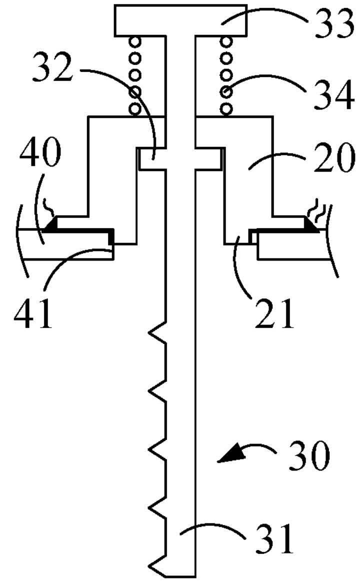
FIG. 8 is a schematic view of the transmission device according to the third embodiment of the disclosure.

As shown in FIG. 8, unlike the first embodiment, the third embodiment has distinguishing technical features as described below. In the third embodiment, the fitting portion 21 is a solderable member, and the body 40 has the securing portion 41. The fitting portion 21 is disposed at the securing portion 41. Solder is applied to the fitting portion 21 and heated up to fix the corpus portion 20 to the body 40 by soldering.

In the first, second and third embodiments, the corpus portion 20 is fixed to the body 40. In the first embodiment, the material of the body 40 flows into or enters the material-storing space 22, allowing the corpus portion 20 to be fixed to the body 40. In the second embodiment, the corpus portion 20 is fixed to the body 40 by expanded connection. In the third embodiment, the corpus portion 20 is fixed to the body 40 by soldering. In a variant embodiment illustrated by FIG. 2B, the body 40 has a rotation-preventing portion 42, and the rotation-preventing portion 42 is conducive to rotation prevention and position limitation between the corpus portion 20 and the body 40. Alternatively, the rotation-preventing portion 42 is adapted to limit the binding position or direction of the corpus portion 20 relative to the body 40. Alternatively, the rotation-preventing portion 42 is adapted to limit the direction in which the dentate structure undergoes motion. The rotation-preventing portion 42 is D-shaped, polygonal, dentate, concave or convex. The rotation-preventing portion 42 is not necessarily disposed at the body 40. The rotation-preventing portion 42 can, for example, also be disposed at the corpus portion 20 (not shown in the diagram).

Figure 9:
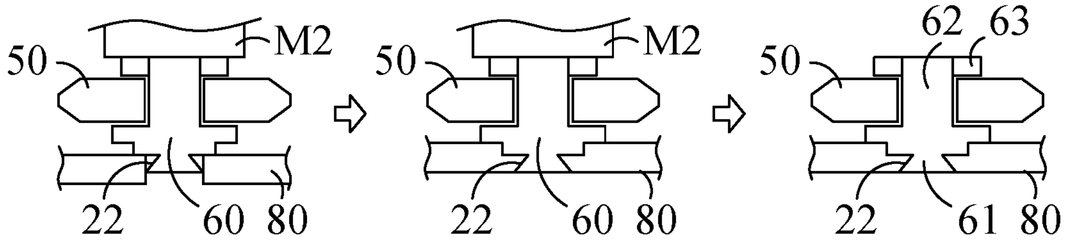
FIG. 9 shows schematic views of a dentate structure allowing the body to enter or flow into a material-storing space according to the embodiments of the disclosure.
Figure 10:
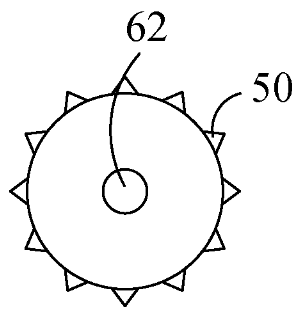
FIG. 10 is a top view of the dentate structure of FIG. 9.
Figure 11:
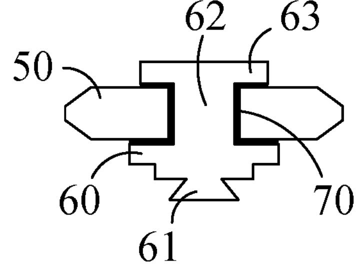
FIG. 11 is a schematic view showing an intervening member disposed between the dentate structure and the corpus portion according to the embodiments of the disclosure.

In an embodiment illustrated by FIG. 9, the dentate structure comprises a seat portion 60. The seat portion 60 has a coupling portion 61, an axle portion 62 and a control portion 63. The gear 50 is restrained by the control portion 63 and thus movably coupled to the axle portion 62 (as shown in FIG. 10). The dentate structure further comprises an intervening member 70 (shown in FIG. 11) conducive to a reduction of friction. The intervening member 70 is disposed between the seat portion 60 and the gear 50 to reduce the friction between the gear 50 in rotation and the seat portion 60.

In an embodiment, the coupling portion 61 of the seat portion 60 has a fill space 64. The seat portion 60 is pressed against an object 80 such that the material of the object 80 flows into or enters the fill space 64, allowing the coupling portion 61 to be fixed to the object 80.

In an embodiment, the coupling portion 61 is integrally formed with the seat portion 60, but the disclosure is not limited thereto; for example, the coupling portion 61 and the seat portion 60 are two separate elements coupled to each other. In an embodiment, the axle portion 62 and the control portion 63 are two separate elements coupled to each other, but the disclosure is not limited thereto; for example, the axle portion 62 and the control portion 63 are integrally formed.

Regarding the dentate structure, the coupling portion 61 is placed at a binding portion 81 of the object 80, with the seat portion 60 abutting against the object 80. As shown in FIG. 9, for example, a mold M2 abuts against the control portion 63 and thus presses the seat portion 60 against the object 80 such that the material of the object 80 undergoes deformation at a point corresponding in position to the fill space 64 and then flows into or enters the fill space 64, allowing the seat portion 60 to be fixed to the object 80 through the coupling portion 61.

Figure 12:
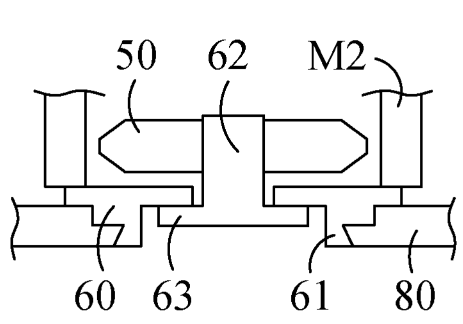
FIG. 12 is a schematic view of another dentate structure allowing the body to enter or flow into a material-storing space according to the embodiments of the disclosure.
Figure 13:
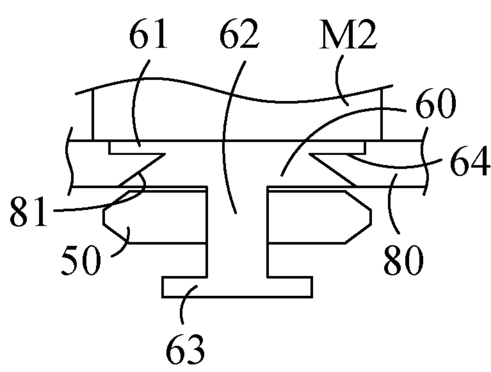
FIG. 13 is a schematic view of yet another dentate structure allowing the body to enter or flow into a material-storing space according to the embodiments of the disclosure.

As shown in FIG. 12, in another aspect of this embodiment, the axle portion 62 and the control portion 63 are integrally formed, with the axle portion 62 fixed to the gear 50. The axle portion 62 is movably disposed at the seat portion 60. The mold M2 presses the seat portion 60 against the object 80 such that the material of the object 80 undergoes deformation at a point corresponding in position to the fill space 64 and then flows into or enters the fill space 64, allowing the seat portion 60 to be fixed to the object 80 through the coupling portion 61. As shown in FIG. 13, in another aspect of this embodiment, the axle portion 62 is movably disposed at the seat portion 60. The mold M2 presses the coupling portion 61 against the object 80 such that the material of the object 80 undergoes deformation at a point corresponding in position to the fill space 64 and then flows into or enters the fill space 64, allowing the seat portion 60 to be fixed to the object 80 through the coupling portion 61.

Figure 14:
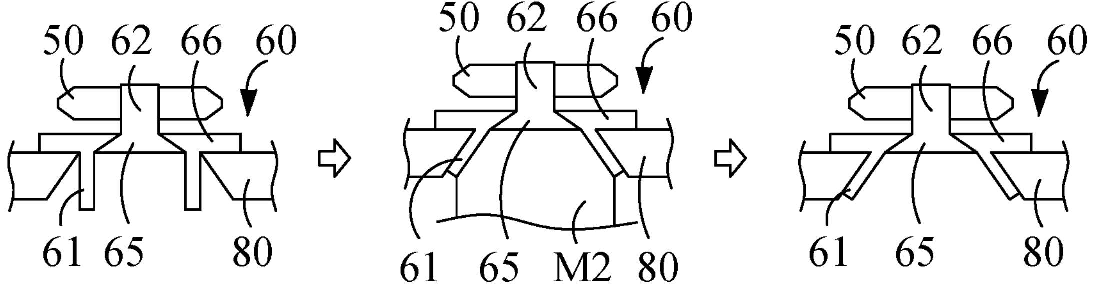
FIG. 14 shows schematic views of a dentate structure secured in place by expanded connection according to the embodiments of the disclosure.

The dentate structure of the disclosure can also be implemented in some other aspects of embodiment. As shown in FIG. 14, in an embodiment, the axle portion 62 of the seat portion 60 is fixedly coupled to the gear 50 and has a stopping portion 65 outside the gear 50. The seat portion 60 has a bottom portion 66 movably coupled to the axle portion 62. The bottom portion 66 is confined to between the gear 50 and the stopping portion 65. Therefore, the gear 50 is rotatably coupled to the seat portion 60.

In an embodiment, the coupling portion 61 is an expanded connection structure. The coupling portion 61 is disposed at the binding portion 81. For example, the mold M2 presses the coupling portion 61 against the object 80 to not only allow the dentate structure to be fixed to the object 80 by the coupling portion 61 through expanded connection but also allow the coupling portion 61 of the seat portion 60 to be fitted to the object 80.

Figure 15:
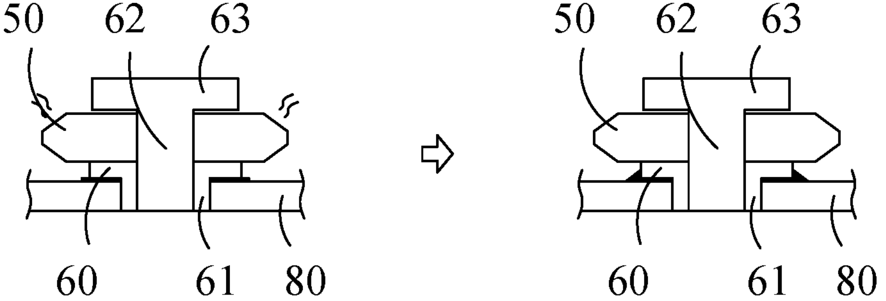
FIG. 15 shows schematic views of a dentate structure secured in place by soldering according to the embodiments of the disclosure.

As shown in FIG. 15, in an embodiment, the coupling portion 61 is a solderable member, and the object 80 has a binding portion 81. The coupling portion 61 is disposed at the binding portion 81. Solder is applied to the coupling portion 61 and heated up to fix the seat portion 60 to the object 80 by soldering. The axle portion 62 and the control portion 63 are integrally formed. The coupling portion 61 and the seat portion 60 are two separate elements coupled to each other.

Figure 16A:
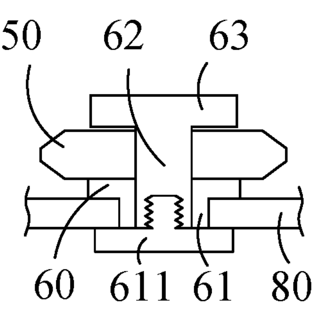
FIG. 16A is a schematic view of a dentate structure secured in place by fastening according to the embodiments of the disclosure.

As shown in FIG. 16A, in an embodiment, the coupling portion 61 comprises a fastening member 611 such that fastening member 611 is fastened to the coupling portion 61 and thus fixedly coupled to the object 80. In this embodiment, in addition to the fastening member 611, the coupling portion 61 can be an engaging member (not shown in the diagram) engaged with the coupling portion 61 and thus fixedly coupled to the object 80. Alternatively, the coupling portion 61 can be a resilient engaging member (not shown in the diagram) engaged with the coupling portion 61 and thus fixedly coupled to the object 80.

Figure 16B:
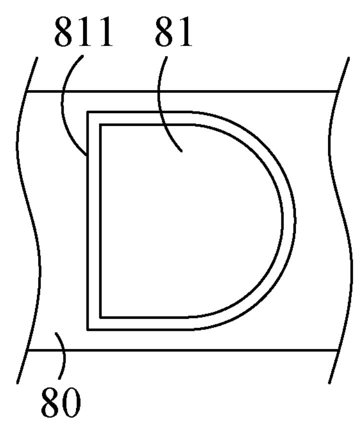
FIG. 16B is a schematic view of the body and the rotation-preventing portion according to the embodiments of the disclosure.

In an embodiment, the binding portion 81 of the object 80 has a rotation-preventing portion 811. The rotation-preventing portion 811 is conducive to rotation prevention and position limitation between the dentate structure and the object 80. Alternatively, the rotation-preventing portion 811 is adapted to limit the binding position or direction of the dentate structure relative to the object 80. Alternatively, the rotation-preventing portion 811 is adapted to limit the direction in which the gear 50 undergoes motion. In an embodiment, the rotation-preventing portion 811 is D-shaped (as shown in FIG. 16B), but the disclosure is not limited thereto; for example, the rotation-preventing portion 811 is also polygonal, dentate, concave or convex.

Figure 17:
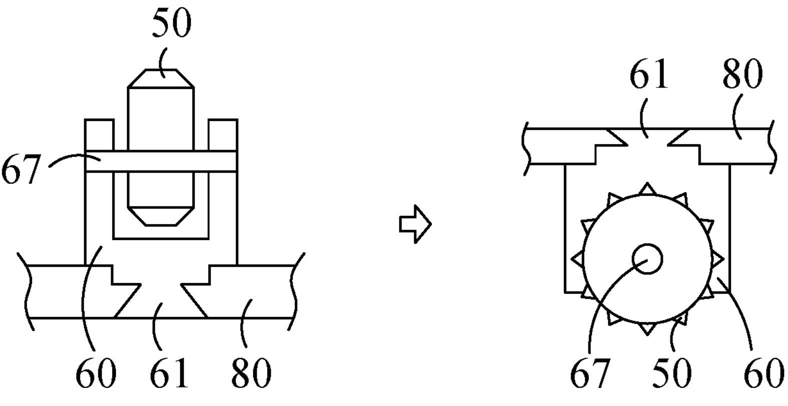
FIG. 17 shows schematic views of a dentate structure secured in place by bolting according to the embodiments of the disclosure.

As shown in FIG. 17, in an embodiment, the seat portion 60 has a bolt portion 67, and the bolt portion 67 is adapted to be movably coupled to the gear 50. The bolt portion 67 is an axle element penetratingly disposed at the seat portion 60. The use of the dentate structure begins with placing the gear 50 at a predetermined position of the seat portion 60, allowing the bolt portion 67 to be penetratingly disposed at the seat portion 60 and the gear 50, and allowing the bolt portion 67 to be rotatably coupled to the seat portion 60.

Figure 18:
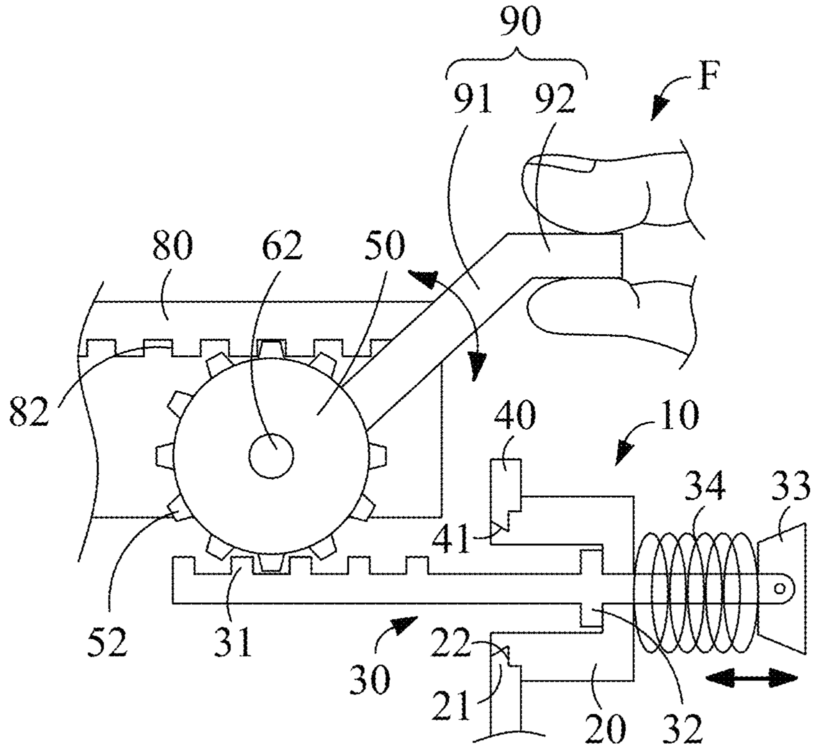
FIG. 18 is a schematic view showing that the dentate structure has a manipulating portion according to any one of the embodiments of the disclosure.

As shown in FIG. 18, in an embodiment, the dentate structure comprises a manipulating portion 90. The manipulating portion 90 extends to one side of the gear 50. In this embodiment, the manipulating portion 90 has an extending segment 91, and the terminating end of the extending segment 91 has a turning segment 92. An included angle is defined between the turning segment 92 and the extending segment 91. In this embodiment, upon the actuation of the manipulating portion 90, the turning segment 92 is turned to enable the gear 50 to rotate and thus become motion-linked to the dentate portion 31, allowing the operating member 30 to undergo motion, for example, linear motion, relative to the corpus portion 20. Alternatively, the operating member 30 is operated such that the dentate portion 31 is actuated and thus motion-linked to the gear 50, and the actuation, such as rotation, of the gear 50 causes the actuation, such as swinging, of the manipulating portion 90. Therefore, the dentate structure of the disclosure demonstrates excellence in practical operation.

As shown in FIGS. 6 and 18, the object 80 has first gear teeth 82, and the gear 50 has second gear teeth 52. The second gear teeth 52 of the gear 50, i.e., the dentate structure, are in contact with the first gear teeth 82 of the object 80 such that the gear 50 undergoes motion by being in contact with the dentate portion 31 by meshing, so as to drive the object 80 undergoing movement, relative motion, motion, rotation or labor-saving motion. The first gear teeth 82 and the dentate portion 31 can be racks or gears. The object 80 and the first gear teeth 82 are integrally formed. Alternatively, the object 80 and the first gear teeth 82 are coupled to each other. However, the disclosure is not limited thereto; for example, the object 80 can have the first gear teeth 82 adapted to come into contact with the dentate structure and thus allow the dentate structure to drive the object 80 undergoing movement, relative motion or motion.

Figure 19:
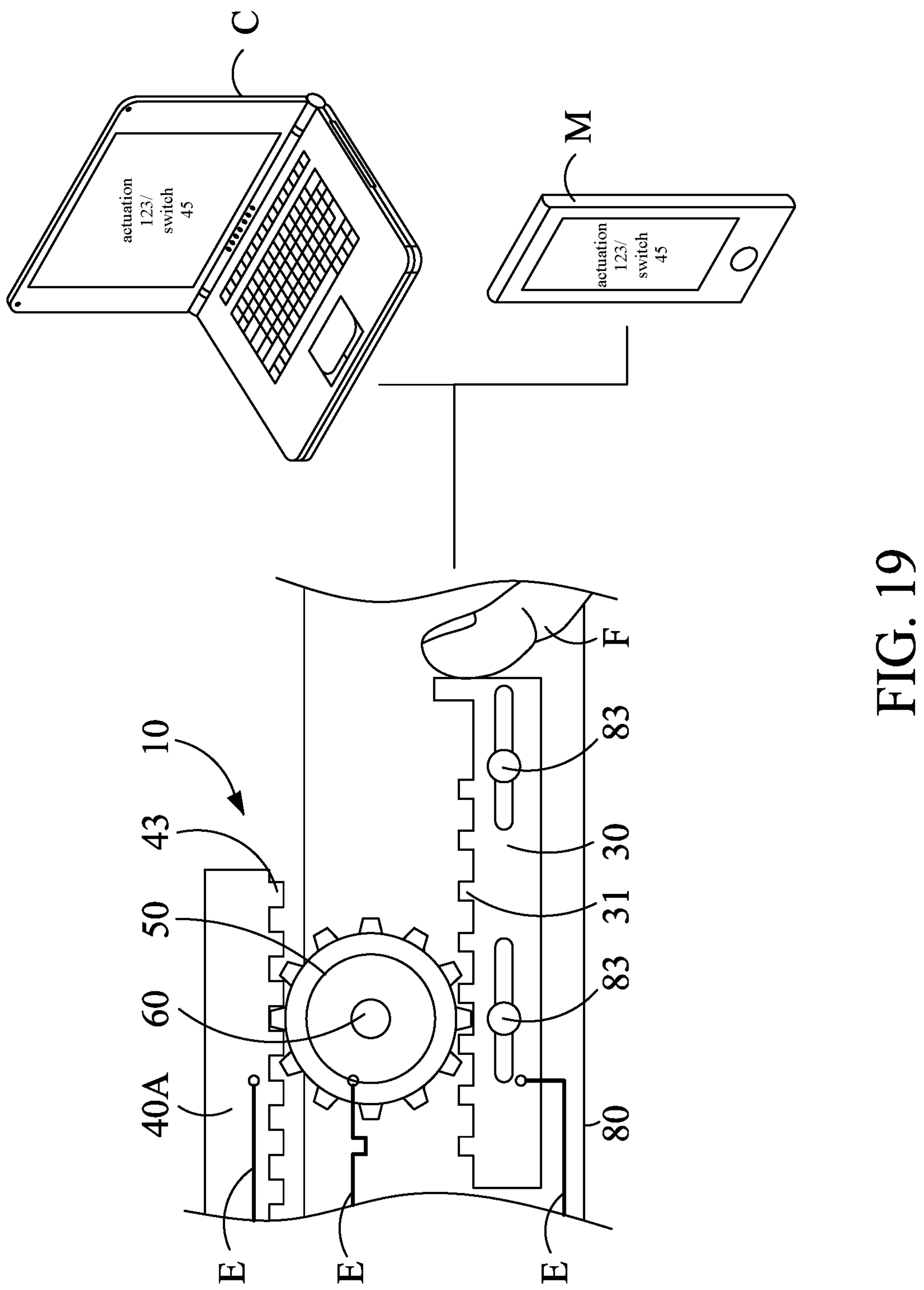
FIG. 19 is a schematic view of the transmission device according to another embodiment of the disclosure.
Figure 20:
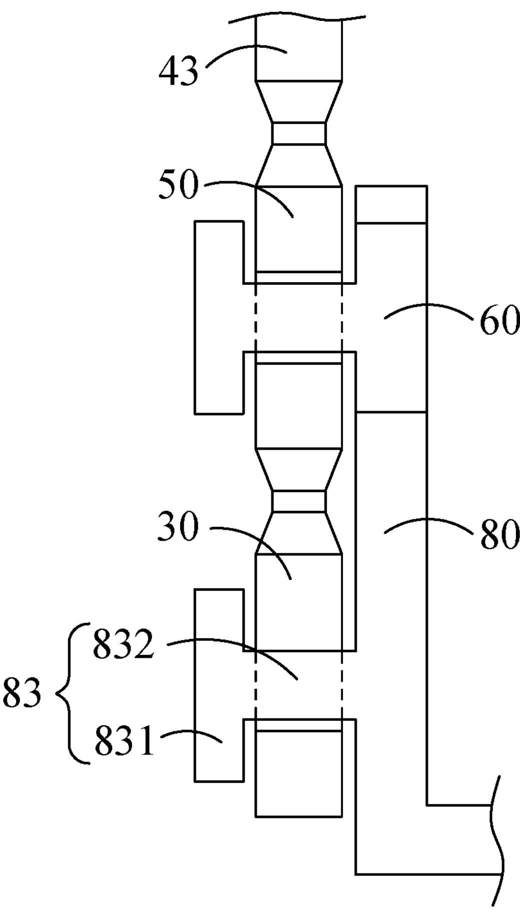
FIG. 20 is a lateral view of FIG. 19.

As shown in FIGS. 19, 20, in another embodiment of the disclosure, the dentate structure comprises an operating member 30, a gear 50 and a seat portion 60. The gear 50 is pivotally connected to the object 80 through the seat portion 60. The object 80 has a fixing element 83. The fixing element 83 comprises a head portion 831 and a neck portion 832. The operating member 30 is movably disposed at the neck portion 832 and restrained by the head portion 831 (as shown in FIG. 20). The gear 50 is configured as teeth 43 in contact with a body 40A. The gear 50 is in contact with the dentate portion 31 of the operating member 30 and is connected between the gear 50, the operating member 30 and the body 40A by a circuit E. The circuit E is in communication connection with an electronic apparatus (for example, a computer C or a mobile phone M) via wireless signals. The finger F moves the operating member 30 to enable the gear 50, the operating member 30 and the body 40A to transmit motion to remotely control the switch of the circuit E and the magnitude of the passing electric current and control the electronic apparatus. Alternatively, an instruction (such as actuation instruction "123" and switch instruction "45" shown in the diagrams) is inputted with the electronic apparatus to use wireless signals to controllably cause the gear 50 to rotate or controllably cause the operating member 30 to move, driving the body 40A to undergo movement, relative motion or motion. Therefore, the dentate structure of the disclosure demonstrates excellence in practical operation.

Figure 21:
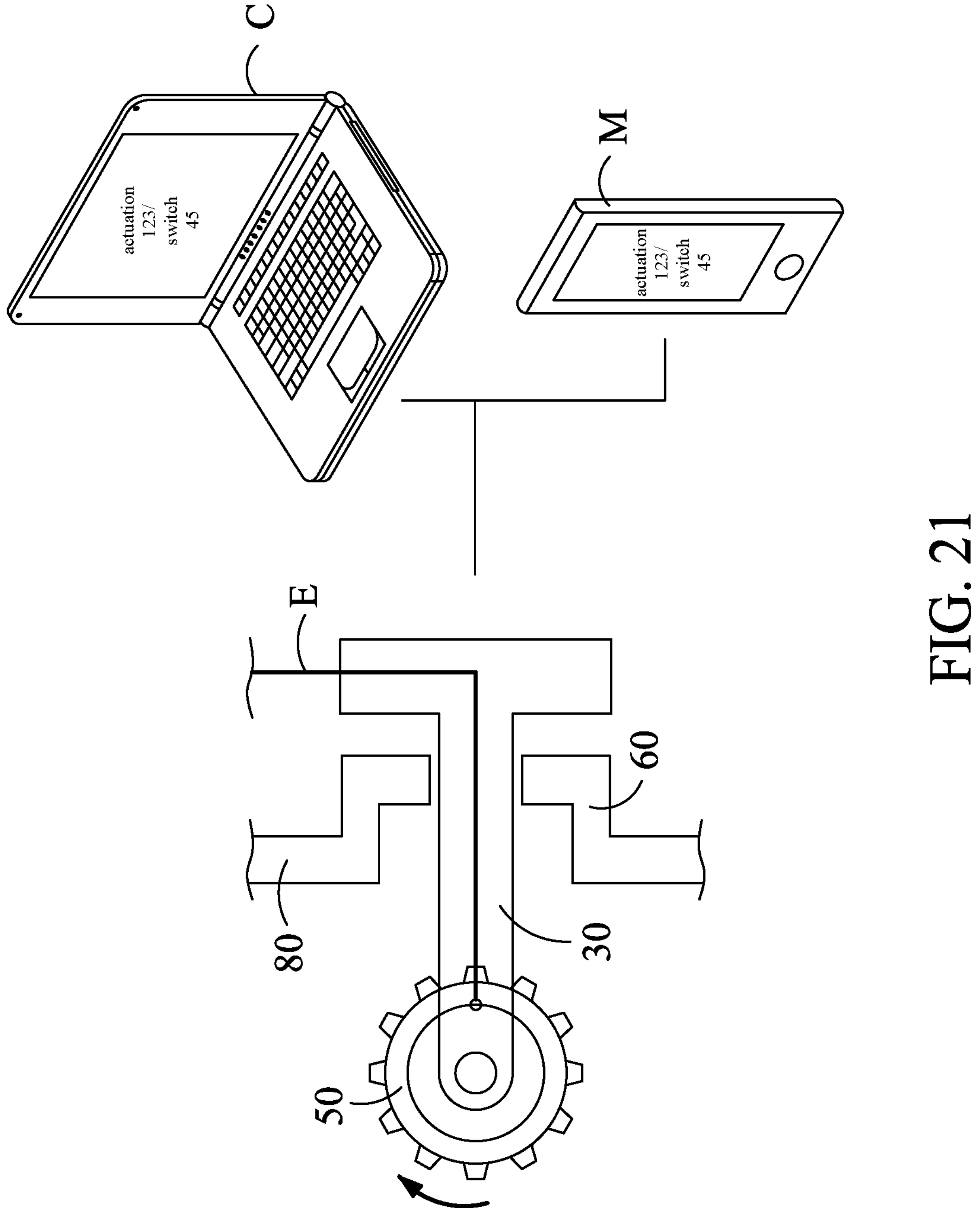
FIG. 21 is a schematic view of the transmission device according to yet another embodiment of the disclosure.

As shown in FIG. 21, in another embodiment of the disclosure, the transmission device 10 comprises an operating member 30, a gear 50 and a seat portion 60. The seat portion 60 and the object 80 are integrally formed. The operating member 30 is movably disposed at the object 80. A circuit E is connected between the gear 50 and the operating member 30. The circuit E is in communication connection with an electronic apparatus (for example, a computer C or a mobile phone M) via wireless signals. The rotation of the gear 50 controls the switch of the circuit E and the magnitude of the passing electric current and thus controls the electronic apparatus. Alternatively, an instruction is inputted with the electronic apparatus to control the gear 50 or controllably cause the operating member 30 to undergo movement, relative motion or motion. Therefore, the transmission device 10 of the disclosure demonstrates excellence in practical operation.

Figure 22:
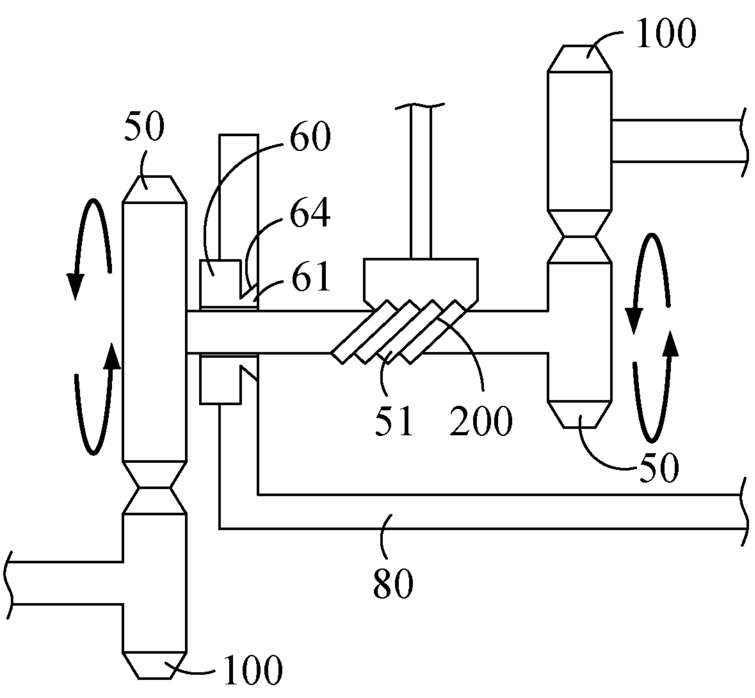
FIG. 22 is a schematic view of the transmission device according to still yet another embodiment of the disclosure.

As shown in FIG. 22, in yet another embodiment of the disclosure, the transmission device 10 comprises a seat portion 60 and two gears 50. The coupling portion 61 of the seat portion 60 has a fill space 64. The two gears 50 are connected by a threaded body 51. The corpus portion 20 is pressed against the object 80 such that the material of the object 80 flows into or enters the fill space 64 to fix the coupling portion 61 to the object 80. The threaded body 51 is movably disposed at the seat portion 60. The two gears 50 are adapted to be in contact with two dentate structures 100 to allow the two gears 50 and the dentate structures 100 to undergo movement, relative motion or motion. The threaded body 51 is in contact with another dentate structure 200 to allow the threaded body 51 and the dentate structure 200 to undergo movement, relative motion or motion. The dentate structures 100, 200 are racks, gears or threaded bodies. Therefore, the dentate structure of the disclosure demonstrates excellence in practical operation.

Figure 23:
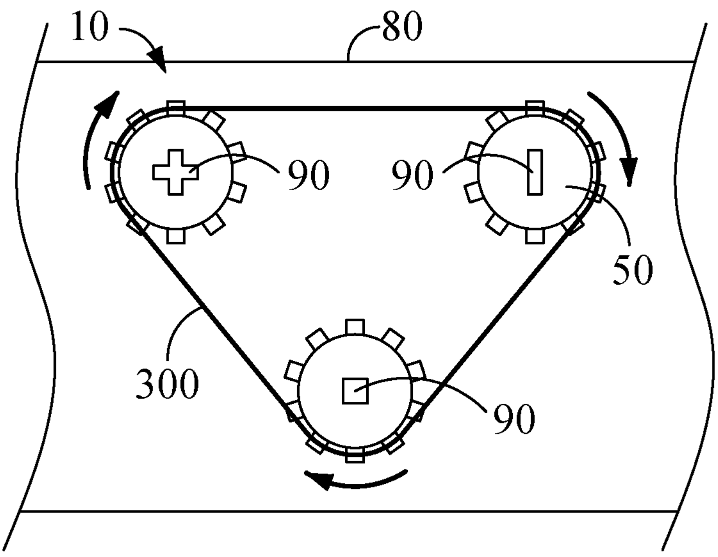
FIG. 23 is a schematic view of the transmission device according to a further embodiment of the disclosure.
Figure 24:
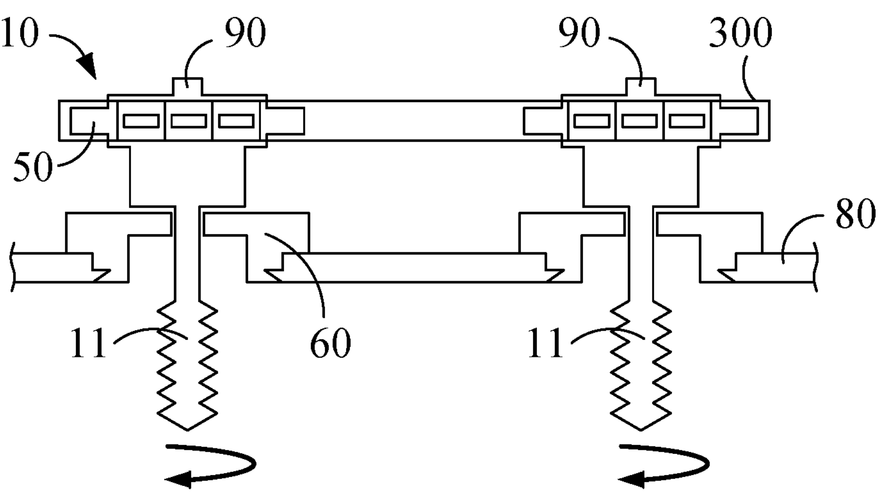
FIG. 24 is a lateral view of the transmission device of FIG. 23.
Figure 25:
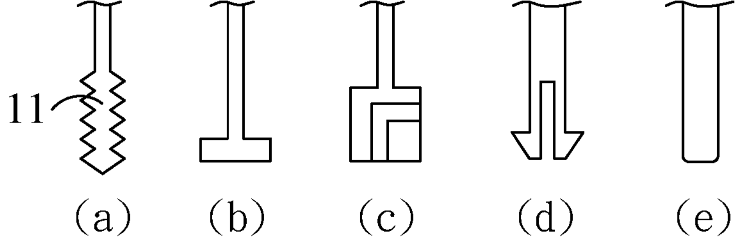
FIG. 25 shows schematic views of an engaging portion in different forms according to the disclosure.

As shown in FIGS. 23, 24 and 25, in another embodiment of the disclosure, the dentate structures are in the number of two or more. This embodiment is, as shown in FIG. 23, exemplified by three dentate structures (gears 50) connected by a connection component 300 and adapted to be driven, moved, jointly moved or motion-linked. The connection component 300 is a link, track, strip-shaped piece, belt, metallic band, non-metallic band, dentate body, or chain. As shown in FIG. 24, the dentate structure has an engaging portion 11 adapted to be driven, moved, jointly moved or motion-linked. Alternatively, the engaging portion 11 is for use in fastening or for being fastened to another body (not shown in the diagram). As shown in FIG. 25, the engaging portion 11 is a threaded body (part a in FIG. 25), outer fastener (part b in FIG. 25), inner fastener (part c in FIG. 25), resilient fastener (part d in FIG. 25), or post (part e in FIG. 25). As shown in FIG. 23, each dentate structure has a manipulating portion 90 for controllably operating or moving the engaging portion 11, and the manipulating portion 90 is cruciform, rectangular or square in shape. Therefore, the dentate structure of the disclosure demonstrates excellence in practical operation.

Advantages of the disclosure are as follows:

1. According to the disclosure, the transmission device 10 for a dentate structure can be disposed at the body 40 and comprises the operating member 30 having the dentate portion 31 for transmittingly meshing with the gear 50 to allow the operating member 30 to perform transmission on the gear 50, allowing the transmission on the gear 50 to be flexibly applicable to the body 40. Alternatively, two operating members 30 transmittingly mesh with each other through the dentate portions 31 to not only allow one operating member 30 to be driven by and motion-linked to the other operating member 30 but also allow the transmission on dentate objects to be flexibly applicable to the body 40.
2. The dentate structure is described above. The gear 50 is rotatably coupled to the seat portion 60. The coupling portion 61 of the seat portion 60 is fitted to the object 80 such that the same seat portion 60 is applicable to the gears 50 with different diameters, allowing the transmission on the gears 50 to be flexibly applicable to the object 80. The gear 50 is rotatably coupled to the seat portion 60, and thus the seat portion 60 and the gear 50 are made of different materials to attain structural reinforcement, reduce cost, and greatly improve the manufacturing process.

The invention is disclosed above by preferred embodiments. However, persons skilled in the art should understand that the embodiments are illustrative of the invention only, but shall not be interpreted as restrictive of the scope of the invention. Hence, all equivalent modifications and replacements made to the aforesaid embodiments shall be deemed falling within the scope of the claims of the invention. Accordingly, the legal protection for the invention shall be defined by the appended claims.

What is claimed is:

1. A transmission device for a dentate structure, comprising:

a corpus portion adapted to be disposed at a body;

an operating member movably fitted to the corpus portion and having a dentate portion;

an object having teeth; and a gear, wherein the gear is in contact with the teeth and the dentate portion, and the gear undergoes motion by being in contact with the dentate portion while the operating member is operated, so as to drive the object to undergo movement, relative motion, motion, rotation or labor-saving motion, wherein the operating member has an abutting portion, a head portion, and a resilient component, wherein the abutting portion is adapted to abut against the corpus portion, and the head portion is adapted to abut against the corpus portion, and wherein the resilient component has an end abutting against the corpus portion from inside and another end abutting against the abutting portion, so as to allow the operating member to be normally pushed in a direction toward the dentate portion.

2. A transmission device for a dentate structure, comprising:

a corpus portion adapted to be disposed at a body;

an operating member movably fitted to the corpus portion and having a dentate portion;

an object having teeth; and a gear, wherein the gear is in contact with the teeth and the dentate portion, and the gear undergoes motion by being in contact with the dentate portion while the operating member is operated, so as to drive the object to undergo movement, relative motion, motion, rotation or labor-saving motion, and wherein the operating member is bolted to a head portion being movable, relative to the corpus portion, to an abutting high-position or an abutting low-position to abut against the corpus portion, and adapted to resist a resilience force of a resilient component and thus attain positioning upon completion of the movement of the operating member.

3. A transmission device for a dentate structure, comprising:

a corpus portion adapted to be disposed at a body;

an operating member movably fitted to the corpus portion and having a dentate portion;

an object having teeth; and a gear, wherein the gear is in contact with the teeth and the dentate portion, and the gear undergoes motion by being in contact with the dentate portion while the operating member is operated, so as to drive the object to undergo movement, relative motion, motion, rotation or labor-saving motion, and wherein a circuit is connected between the dentate structure, the operating member and a second body, the circuit is in communication connection with an electronic apparatus via wireless or wired signals, the operating member is moved to allow the dentate structure, the operating member and the second body to transmit motion to control the electronic apparatus.

* * * * *